(12) United States Patent
Maeda

(10) Patent No.: US 12,017,358 B2
(45) Date of Patent: Jun. 25, 2024

(54) ROBOT SYSTEM ASSISTING WORK OF WORKER, CONTROL METHOD, MACHINE LEARNING APPARATUS, AND MACHINE LEARNING METHOD

(71) Applicant: FANUC CORPORATION, Yamanashi (JP)

(72) Inventor: Keita Maeda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 352 days.

(21) Appl. No.: 16/994,665

(22) Filed: Aug. 17, 2020

(65) Prior Publication Data

US 2021/0094175 A1 Apr. 1, 2021

(30) Foreign Application Priority Data

Sep. 26, 2019 (JP) ................. 2019-176122

(51) Int. Cl.
*B25J 9/16* (2006.01)
*B25J 13/08* (2006.01)

(52) U.S. Cl.
CPC ............... *B25J 9/163* (2013.01); *B25J 9/161* (2013.01); *B25J 9/1664* (2013.01); *B25J 13/089* (2013.01)

(58) Field of Classification Search
CPC ........ B25J 9/1664; B25J 13/089; B25J 9/161; B25J 9/163; G05B 2219/40202; G05B 2219/40391; G05B 2219/40409; G05B 2219/40114; G06Q 10/06; G06Q 10/063114; G06Q 10/06398; G06Q 10/063112; G06T 7/20; G06T 7/251; G06V 40/20
See application file for complete search history.

(56) References Cited

U.S. PATENT DOCUMENTS

| | | | |
|---|---|---|---|
| 11,556,879 B1* | 1/2023 | Timmons | G06T 7/20 |
| 2011/0184555 A1* | 7/2011 | Kosuge | B25J 11/00 |
| | | | 700/245 |
| 2016/0260027 A1* | 9/2016 | Kuwabara | G06N 99/005 |

(Continued)

FOREIGN PATENT DOCUMENTS

| | | |
|---|---|---|
| JP | 2010-014712 A | 1/2010 |
| JP | 2010-264559 A | 11/2010 |

(Continued)

*Primary Examiner* — Khoi H Tran
*Assistant Examiner* — Tanner L Cullen
(74) *Attorney, Agent, or Firm* — HAUPTMAN HAM, LLP

(57) ABSTRACT

A robot system assisting a worker to allow the worker to perform a work more smoothly. The robot system includes a robot, a detection device configured to detect motion of a worker when the worker is performing a predetermined work, an end determination section configured to determine whether the work is ended or not on the basis of detection data from the detection device, and a robot controller configured to cause the robot to carry out an article-feed operation or an article-fetch operation when the end determination section determines that the work is ended, the article-feed operation transporting an article for the work to a predetermined position to feed the article to the worker, the article-fetch operation fetching the article used for the work and transporting the article to a predetermined storage location.

11 Claims, 12 Drawing Sheets

(56) References Cited

U.S. PATENT DOCUMENTS

| | | | |
|---|---|---|---|
| 2017/0136627 A1* | 5/2017 | Takaichi | B25J 9/1694 |
| 2018/0126558 A1* | 5/2018 | Ooba | B25J 19/06 |
| 2018/0326584 A1* | 11/2018 | Wang | B25J 9/1664 |
| 2019/0014206 A1* | 1/2019 | Kuhn | G03F 1/24 |
| 2020/0265256 A1* | 8/2020 | Ozawa | G06T 7/20 |
| 2020/0265363 A1* | 8/2020 | Yadhunandan | G06Q 10/06395 |

FOREIGN PATENT DOCUMENTS

| | | | | |
|---|---|---|---|---|
| JP | 2010271536 A | * | 12/2010 | Y02P 90/30 |
| JP | 2013-151062 A | | 8/2013 | |
| JP | 201858178 A | | 4/2018 | |
| JP | 2018058172 A | * | 4/2018 | B25J 13/00 |
| WO | 2019097676 A1 | | 5/2019 | |

\* cited by examiner

ROBOT SYSTEM ASSISTING WORK OF WORKER, CONTROL METHOD, MACHINE LEARNING APPARATUS, AND MACHINE LEARNING METHOD

RELATED APPLICATIONS

The present application claims priority to Japanese Application Number 2019-176122, filed Sep. 26, 2019, the disclosure of which is hereby incorporated by reference herein in its entirety.

BACKGROUND OF THE INVENTION

1. Field of the Invention

The present invention relates to a robot system assisting a work of a worker, a robot control method, a machine learning apparatus, and a machine learning method.

2. Description of the Related Art

Robot systems assisting a work of a worker are known (e.g., JP 2018-058178 A). There has been demand for a robot system assisting a worker to allow the worker to perform a work more smoothly.

SUMMARY OF THE INVENTION

In an aspect of the present disclosure, a robot system configured to assist a work by a worker, includes a robot; a detection device configured to detect a motion of the worker when the worker is performing a predetermined work; an end determination section configured to determine whether or not the work is ended, based on detection data of the detection device; and a robot controller configured to, when the end determination section determines that the work is ended, cause the robot to carry out an article-feed operation to transport an article for the work to a predetermined position in order to feed the article to the worker, or an article-fetch operation to fetch the article which has been used for the work and transport it to a predetermined storage location.

In another aspect of the present disclosure, a method of controlling a robot configured to assist a work by a worker, includes detecting, by a detection device, a motion of the worker when the worker is performing a predetermined work; determining whether or not the work is ended, based on detection data of the detection device; and when determined that work is ended, causing the robot to carry out an article-feed operation to transport an article for the work to a predetermined position in order to feed the article to the worker, or an article-fetch operation to fetch the article which has been used for the work and transport it to a predetermined storage location.

In yet another aspect of the present disclosure, a machine learning apparatus configured to learn a timing of when a work by a worker is ended, includes a learning data acquisition section configured to acquire, as a learning data set, detection data of a detection device configured to detect a motion of the worker, when the worker is performing a predetermined work, and label information indicating a stage of the work or a time needed for the work; and a learning section configured to generate a learning model representing a correlation between the motion and the stage or the time, using the learning data set.

In still another aspect of the present disclosure, a machine learning method of learning a timing of when a work by a worker is ended, includes acquiring, as a learning data set, detection data of a detection device configured to detect a motion of the worker when the worker is performing a predetermined work, and label information indicating a stage of the work or a time needed for the work; and generating a learning model representing a correlation between the motion and the stage or the time, using the learning data.

According to the present disclosure, the robot controller causes the robot to carry out the article-feed operation or the article-fetch operation at the timing of when the work is ended, and thus the work by the worker can be assisted to allow the worker to perform the work smoothly.

DETAILED DESCRIPTION

Figure 1:
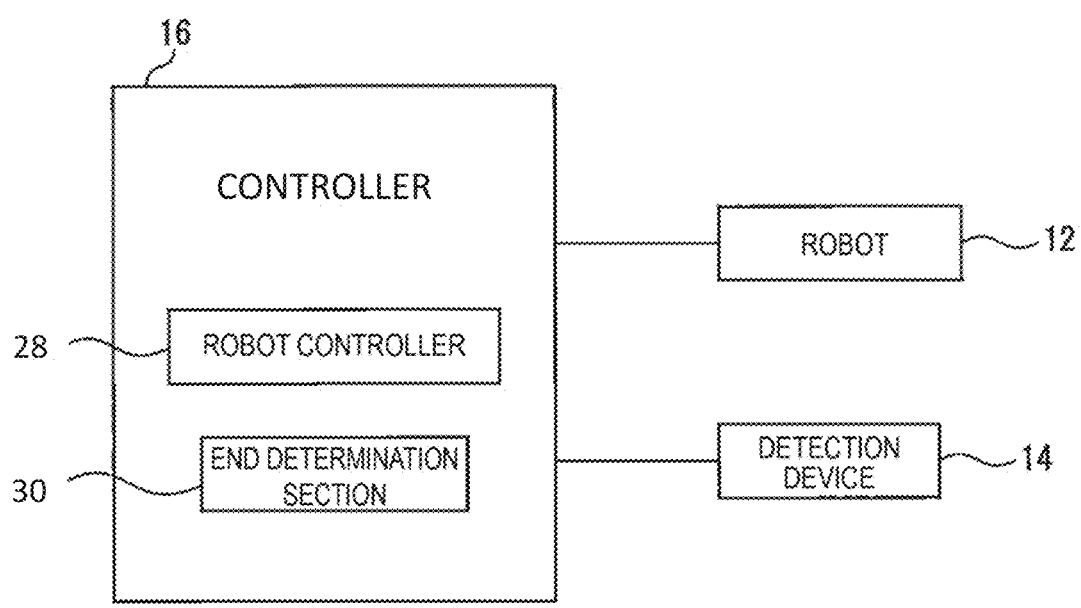
FIG. 1 is a block diagram of a robot system according to an embodiment.

Hereinafter, embodiments of the present disclosure will be described in detail with reference to the drawings. In the various embodiments described below, the same components are denoted by the same reference numeral, and redundant descriptions thereof will be omitted. First, a robot system 10 according to an embodiment will be described with reference to FIGS. 1 and 2. The robot system 10 is configured to carry out a work in cooperation with a worker A, and includes a robot 12, a detection device 14, and a controller 16.

In the present embodiment, the robot 12 is a vertical, articulated robot, and includes a base 18, a turning body 20, a robot arm 22, a wrist 24, and a robot hand 26. The base 18 is fixed on a floor of a work cell. The turning body 20 is provided at the base 18 so as to be rotatable around a vertical axis.

The robot arm 22 includes a lower arm 23 attached to the turning body 20 so as to be rotatable around a horizontal axis, and an upper arm 25 rotatably attached to a distal end of the lower arm 23. The wrist 24 is coupled to a distal end of the upper arm 25, and rotatably supports the robot hand 26. The robot hand 26 includes a plurality of fingers 26a that can open and close, and grasps or releases an article by the fingers 26a.

A servomotor (not illustrated) is built in each of the components of the robot 12 (base 18, turning body 20, robot arm 22, wrist 24, and robot hand 26). Under a command from the controller 16, the servomotor rotates each movable component of the robot 12 (the turning body 20, the robot arm 22, and the wrist 24) around a drive shaft so as to operate the robot 12.

A robot coordinate system $C_R$ is set for the robot 12. The robot coordinate system $C_R$ is for automatically controlling the movable components of the robot 12 (the turning body 20, the robot arm 22, and the wrist 24) in a three-dimensional space. In the present embodiment, the robot coordinate system $C_R$ is set such that an origin thereof is disposed at the center of the base 18, a z-axis thereof is disposed parallel to the vertical direction, and the turning body 20 is rotated around the z-axis.

The controller 16 generates a command for each servomotor built in the robot 12 on the basis of the robot coordinate system $C_R$, and causes each servomotor to operate the movable components of the robot 12 so as to arrange the robot hand 26 at any position and orientation in the robot coordinate system $C_R$.

The detection device 14 detects a motion of the worker A when the worker A is performing a predetermined work. In the present embodiment, the detection device 14 includes an image sensor, an optical system such as a focus lens, and an image processor (e.g., a GPU). The detection device 14 captures an image of the worker A performing the work along a predetermined visual line direction VD, and detects the motion of the worker A on the basis of the captured image (so called, an optical motion capture). The work performed by the worker will be described below.

The controller 16 controls the robot 12 and the detection device 14. The controller 16 is a computer including a processor (CPU, GPU, etc.), a memory (ROM, RAM, etc.), an input device (keyboard, mouse, touch sensor, etc.), and a display (liquid crystal display, organic EL display, etc.). The processor of the controller 16 performs arithmetic processing for executing various functions described below.

Figure 3:
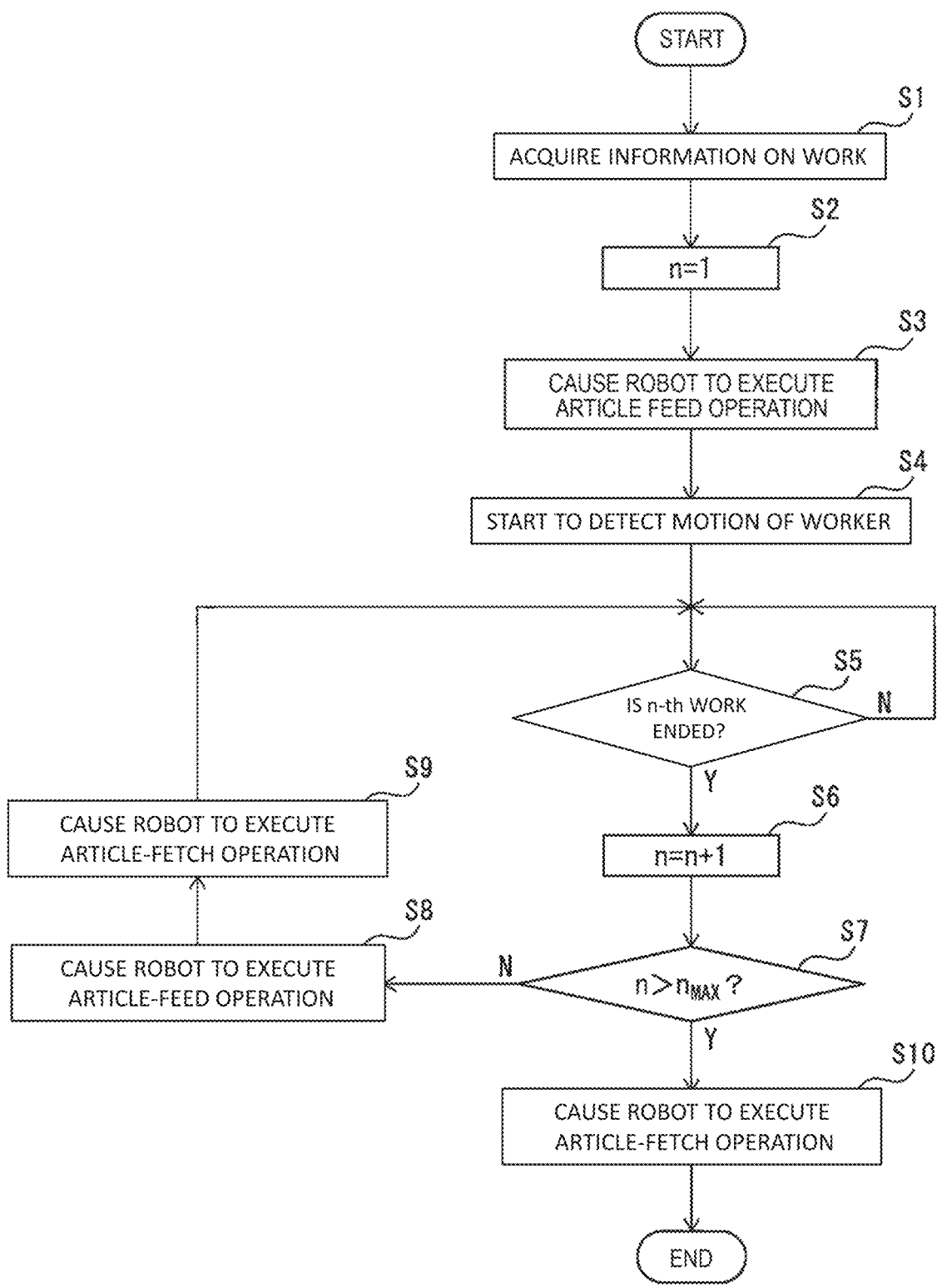
FIG. 3 is a flow chart illustrating an example of the operation flow of the robot system illustrated in FIG. 1.

Next, the operation of the robot system 10 will be described with reference to FIG. 3. A flow illustrated in FIG. 3 is started when the controller 16 receives a work-start command from an operator, a host controller, or a computer program. In step S1, the controller 16 acquires information on the work to be performed by the worker A.

In the present embodiment, the worker A performs a total of $n_{MAX}$ ($n_{MAX}$ is a positive integer) types of works in order of a first work, a second work, ... an n-th work, ... and an $n_{MAX}$-th work, wherein the worker A uses an n-th tool $T_n$ to perform the n-th work (n=1 to $n_{MAX}$). Note that the n-th tools $T_n$ may be different from each other or that at least two tools (the (n=1)-th tool $T_{n-1}$ and the n-th tool $T_n$) may be the same.

In this step S1, the controller 16 acquires the work information from the operator, the host controller, or the computer program. The work information includes information identifying the type and order of the n-th work and the type of the n-th tool (e.g., identification numbers, etc.). From the work information, the controller 16 can recognize the order in which the work is to be performed, and the tool $T_n$ to be fed to the worker A.

Note that the worker A may operate the input device of the controller 16 to input the work information. Alternatively, the worker A may input the work information, using a voice recognition technique. In this case, the controller 16 is further provided with a microphone for inputting sound, and a computer program for the voice recognition technique is preliminary installed in the controller 16.

Figure 4:
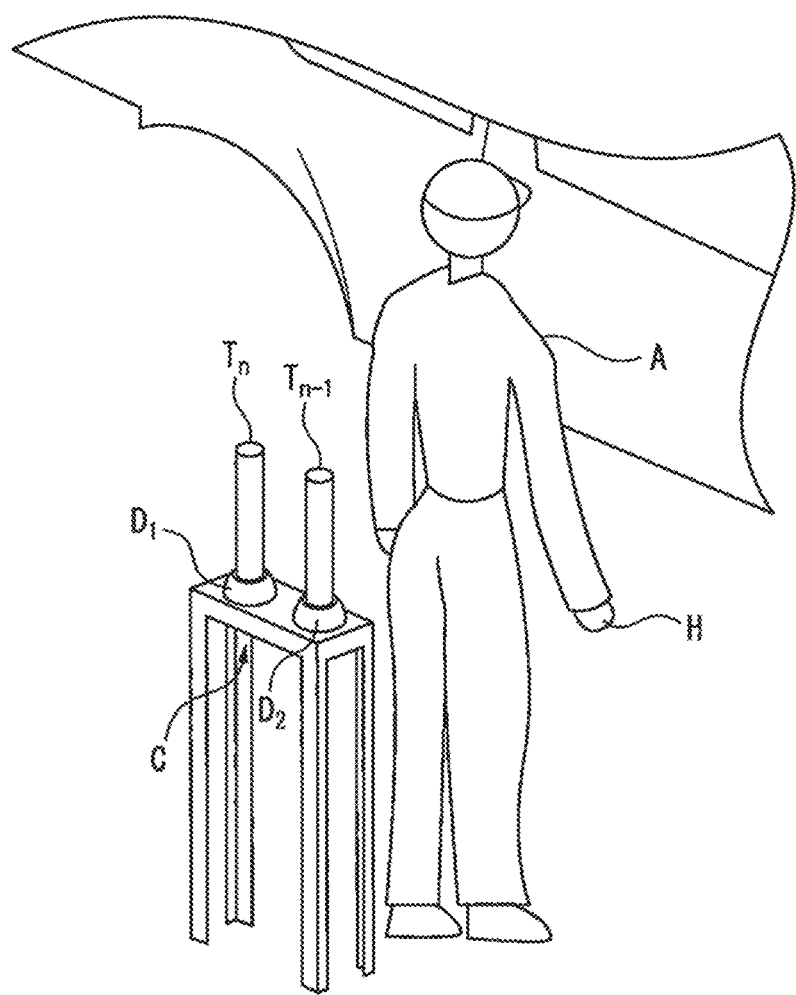
FIG. 4 is an enlarged view of a working table illustrated in FIG. 2.

In step S2, the controller 16 sets a number "n" identifying the n-th work (i.e., the n-th tool $T_n$) to "1." In step S3, the controller 16 causes the robot 12 to carry out an article-feed operation. In the present embodiment, as illustrated in FIG. 4, a placing table C is installed at a predetermined position within the work cell. A first jig $D_1$ and a second jig $D_2$ are provided on the placing table C.

A tool T to be used by the worker A for the next work is set to the first jig $D_1$ by the robot 12. On the other hand, the worker A manually sets the tool T, which has been used for the work, to the second jig $D_2$, after performing the work. In addition, a storage stand E on which the tools T are stored is installed at a predetermined position within the work cell. The n-th tool $T_n$ to be used for the n-th work is stored stationary at a predetermined position on the storage stand E. Position data (coordinate data) in the robot coordinate system $C_R$ of the first jig $D_1$, the second jig $D_2$, and the n-th tools $T_n$ on the storage stand E are pre-stored in the memory of the controller 16.

In this step S3, the controller 16 causes the robot 12 to carry out the article-feed operation on the basis of the position data in the robot coordinate system $C_R$ of the first tool $T_1$ and the first jig $D_1$, and the robot 12 grasps the first tool $T_1$ stored on the storage stand E by its robot hand 26, sets the first tool $T_1$ to the first jig $D_1$, in accordance with the command from the controller 16.

In step S4, the detection device 14 starts to detect the motion of the worker A. Specifically, in response to the command from the controller, the detection device 14 continuously captures an image of the worker A (in other words, captures a moving image), and detects the motion of the worker A on the basis of the captured image. In this way, the detection device 14 transmits detection data DD indicating the motion of the worker A (e.g., image data continuously indicating the motion of the worker A in time-series) to the controller 16.

In step S5, the controller 16 determines whether or not the n-th work is ended, based on the detection data DD of the detection device 14. A method of determining a timing of when the n-th work is ended will be described below with reference to FIGS. 5 and 6. As an example, the n-th work may be defined as a work in which the worker A fastens a fastener G (such as a bolt) in each of five fastening holes $F_1$ to $F_5$ illustrated in FIG. 5, using the n-th tool $T_n$ (FIG. 6), in order of fastening holes $F_1 \rightarrow F_2 \rightarrow F_3 \rightarrow F_4 \rightarrow F_5$.

In this case, the worker A first takes the n-th tool $T_n$ set in the first jig $D_1$ with his/her hand H, and performs the n-th work to sequentially fasten the fasteners G in the fastening holes $F_1$ to $F_5$ by the n-th tool $T_n$. After the n-th work has been ended (that is, the fastener G has been fastened to the last fastening hole $F_5$), the worker A sets the used n-th tool $T_n$ to the second jig $D_2$.

The controller 16 analyzes the detection data DD acquired from the detection device 14, and determines whether or not the n-th work, which includes a series of motions to sequentially fasten the fasteners G to the fastening holes $F_1$ to $F_5$, is ended. As an example, the controller 16 continuously calculates, from the acquired detection data DD, a distance I (FIG. 6) between a portion of the body of the worker A (in this case, the hand H) and the fastening hole $F_5$ which is the last working location, and monitors whether or not the distance I is equal to or smaller than a predetermined threshold $I_{th}$ ($I \leq I_{th}$).

When detecting that $I \leq I_{th}$ is satisfied, the controller 16 determines that the n-th work is ended. In this case, the position data of the fastening holes $F_5$ in the robot coordinate system $C_R$ is pre-stored in the memory of the controller 16. The controller 16 can calculate the distance I from the position data of the fastening holes $F_5$ in the robot coordinate system $C_R$ and the detection data DD of the detection device 14.

Alternatively, the controller 16 may determine that the n-th work is ended when a predetermined time (for example, 5 seconds) has elapsed from a time point when it detects that the distance I becomes equal to or smaller than the predetermined threshold $I_{th}$. Alternatively, the controller 16 may determine that the n-th work is ended when the distance I exceeds the threshold $I_{th}$ ($I>I_{th}$) again after the distance I has become equal to or smaller than the predetermined threshold $I_{th}$.

As another example, the controller 16 pre-stores in the memory a reference motion pattern of the motion in which the worker A fastens the fastener G in the fastening hole $F_5$ which is the last working location. This reference motion pattern can be generated on the basis of the detection data DD of the motion of the worker A (or another worker) detected by the detection device 14 when the worker A (or another worker) is performing a reference motion to fasten the fastener G to the last fastening hole $F_5$.

The controller 16 monitors whether or not the notion of the worker A indicated by the detection data DD acquired after the start of step S4 matches the reference motion pattern, and determines that the n-th work is ended when the motion of the worker A matches the reference motion pattern. Note that the controller 16 may determine that the n-th work is ended when a predetermined time has elapsed since it determines that the motion of the worker A matches the reference motion pattern.

By the above-described methods, the controller 16 can determine the timing of when the n-th work is ended. When the controller 16 determines that the n-th work is ended (i.e., determines YES), it proceeds to step S6. On the other hand, when the controller 16 determines that the n-th work is not ended (i.e., determines NO), it loops step S5. Thus, in the present embodiment, the controller 16 functions as an end determination section 30 (FIG. 1) configured to determine whether or not the n-th work is ended on the basis of the detection data DD.

In step S6, the controller 16 increments a number "n" identifying the n-th work (or the n-th tool) by "1" (n=n+1). In step S7, the controller 16 determines whether or not the number "n" identifying the n-th work exceeds the maximum number $n_{MAX}$ of works ($n>n_{MAX}$). When the controller 16 determines that $n>n_{MAX}$ is satisfied (i.e., determines YES), it proceeds to step S10. On the other hand, when the controller 64 determines that $n<n_{MAX}$ is satisfied (i.e., determines NO), it proceeds to step S8.

In step S8, the controller 16 causes the robot 12 to carry out the article-feed operation. Specifically, based on the position data in the robot coordinate system $C_R$ of the n-th tool $T_n$ to be used for the next work, the controller 16 causes the robot 12 to carry out the article-feed operation in which the robot 12 grasps the n-th tool $T_n$ stored in the storage stand E with the robot hand 26, and sets the grasped n-th tool $T_n$ to the first jig $D_1$.

Thus, in the present embodiment, the controller 16 functions as a robot controller 28 (FIG. 1) configured to cause the robot 12 to carry out the article-feed operation to transport the n-th tool $T_n$ for the n-th work to a predetermined position (the first jig $D_1$) in order to feed the n-th tool $T_n$ to the worker A.

In step S9, the controller 16 functions as the robot controller 28 and causes the robot 12 to carry out an article-fetch operation. Specifically, the controller 16 controls the robot 12 on the basis of the position data of the second jig $D_2$ in the robot coordinate system $C_R$, such that the robot 12 grasps the (n−1)-th tool $T_{n-1}$, which has been used for the most-recently performed (n−1)-th work and which is set on the second jig $D_2$, by the robot hand 26.

Then, the controller 16 controls the robot 12 on the basis of the position data in the robot coordinate system $C_R$ of the (n−1)-th tool $T_{n-1}$ to be set on the storage stand E, such that the robot 12 returns the (n−1)-th tool $T_{n-1}$ grasped by the robot hand 26 to a predetermined position on the storage stand E. For example, if the number "n" is set to "4" (n=4) at the time of start of this step S9, the controller 16 causes the robot 12 to fetch the third tool $T_3$, which has been used for the third work, from the second jig $D_2$, and transports the third tool $T_3$ to a predetermined position on the storage stand E.

In this way, the controller 16 causes the robot 12 to carry out the article-fetch operation to fetch the (n−1)-th tool $T_{n-1}$, which has been used for the most-recently performed (n−1)-th work, and transported it to the predetermined storage location (storage stand E). Note that, before executing this step S9, the controller 16 may determine whether the (n−1)-th tool $T_{n-1}$ is set on the second jig $D_2$ based on an image captured by the detection device 14 (or another detection device), and start step S9 when the (n−1)-th tool $T_{n-1}$ is set on the second jig $D_2$.

Alternatively, an article detection sensor (for example, a proximity switch), which is configured to detect that the (n−1)-th tool $T_{n-1}$ is placed on the second jig $D_2$, may be provided at the second jig $D_2$, and the controller 16 may determine whether the (n−1)-th tool $T_{n-1}$ is set on the second jig $D_2$ on the basis of an output signal from the article detection sensor. After step S9, the controller 16 returns to step S5 and carries out a loop of steps S5 to S9 until it determines YES in step S7.

When it is determined YES in step S7, in step S10, the controller 16 functions as the robot controller 28 to cause the robot 12 to carry out the article-fetch operation. Specifically, the controller 16 controls the robot 12 on the basis of the position data of the second jig $D_2$ in the robot coordinate system $C_R$, such that the robot 12 grasps the $n_{MAX}$-th tool $T_{nMAX}$, which has been used for the $n_{MAX}$-th work and which is set on the second jig $D_2$, by the robot hand 26.

Then, the controller 16 controls the robot 12 on the basis of the position data in the robot coordinate system $C_R$ of the $n_{MAX}$-th tool $T_{nMAX}$ to be set on the storage stand E, such that the robot 12 returns the $n_{MAX}$-th tool $T_{nMAX}$ grasped by the robot hand 26 to a predetermined position on the storage stand E.

As described above, in the present embodiment, when the controller 16 determines that the n-th work is ended, the controller 16 causes the robot 12 to carry out the article-feed operation (step S8). According to this configuration, when the worker A performs the (n+1)-th work next to the n-th work, the (n+1)-th tool $T_{n+1}$ for the (n+1)-th work is automatically set to the first jig $D_1$ by the robot 12. Due to this, it is possible to facilitate the worker A to smoothly perform the n-th work.

Additionally, in the present embodiment, when the controller determines that the n-th work is ended, the controller 16 causes the robot 12 to carry out the article-fetch operation (steps S9 and S10). According to this configuration, the used n-th tool $T_n$ can be automatically fetched and returned by the robot 12 when the worker A completes the n-th work. Due to this, it is possible to facilitate the worker A to smoothly perform the work.

Figure 7:
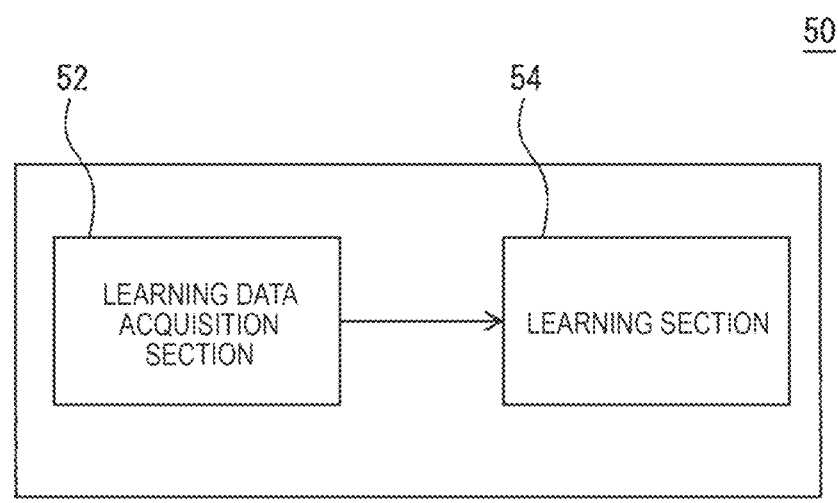
FIG. 7 is a block diagram of a machine learning apparatus according to an embodiment.

Note that, in step S5, the controller 16 may determine whether or not the n-th work is ended, on the basis of a learning model LM representing a correlation between the motion of the worker A performing the n-th work and a stage of the n-th work or a time t needed for the n-th work. With reference to FIG. 7, a machine learning apparatus 50 learning the learning model LM will be described below.

The machine learning apparatus 50 is comprised of a computer including e.g. a processor (CPU, GPU, etc.), a memory (ROM, RAM, etc.), an input device (keyboard, mouse, touch sensor, etc.), and a display (liquid crystal display, organic EL display, etc.), or of software such as a learning algorithm carried out by the computer.

The machine learning apparatus 50 learns the timing of when the worker A ends the n-th work. The machine learning apparatus 50 includes a learning data acquisition section 52 and a learning section 54. As an embodiment of the function of the machine learning apparatus 50, the learning data acquisition section 52 acquires, as a learning data set $DS_1$, the above-described detection data DD of the detection device 14 and label information LI indicating a stage of the n-th work (initial stage, midterm stage, final stage, etc.).

More specifically, the detection device 14 images the worker A along its visual line direction VD when the worker A is performing the n-th work, and detects motion of the worker A on the basis of the captured image.

The detection device 14 supplies to the learning data acquisition section 52 the detection data DD indicating the motion of the worker A (for example, image data continuously indicating the motion of the worker A in time series).

Figure 8:
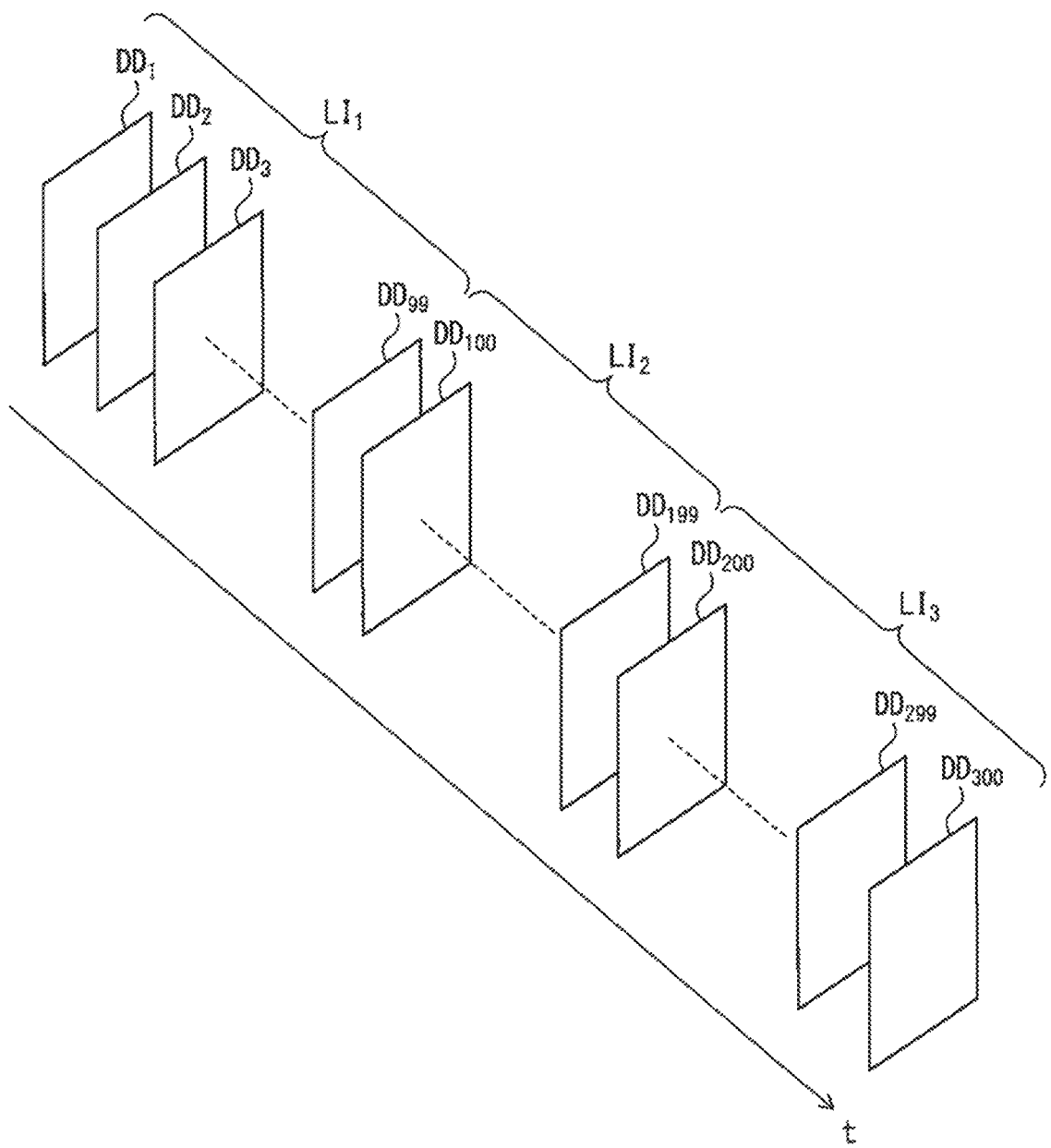
FIG. 8 is a diagram schematically illustrating detection data continuously acquired by a detection device.

FIG. 8 schematically illustrates detection data $DD_m$ continuously acquired by the detection device 14. The horizontal axis in FIG. 8 indicates the time t. Note that FIG. 8 illustrates 300 pieces of detection data $DD_m$ (m=1 to 300) detected by the detection device 14 from the start to the end of the n-th work by the worker A.

The label information LI includes e.g. initial-stage label information $LI_1$ indicating that the n-th work is in an "initial stage", midterm-stage label information $LI_2$ indicating that the n-th work is in a "midterm stage", and final-stage label information $LI_3$ indicating that the n-th work is in a "final stage". Assume that a collection of detection data $DD_1$ to $DD_{99}$ illustrated in FIG. 8 indicates the motion of the worker A fastening first two fastening holes F (e.g., fastening holes $F_1$ and $F_2$) of the fastening holes $F_1$ to $F_5$ in FIG. 5.

Figure 5:
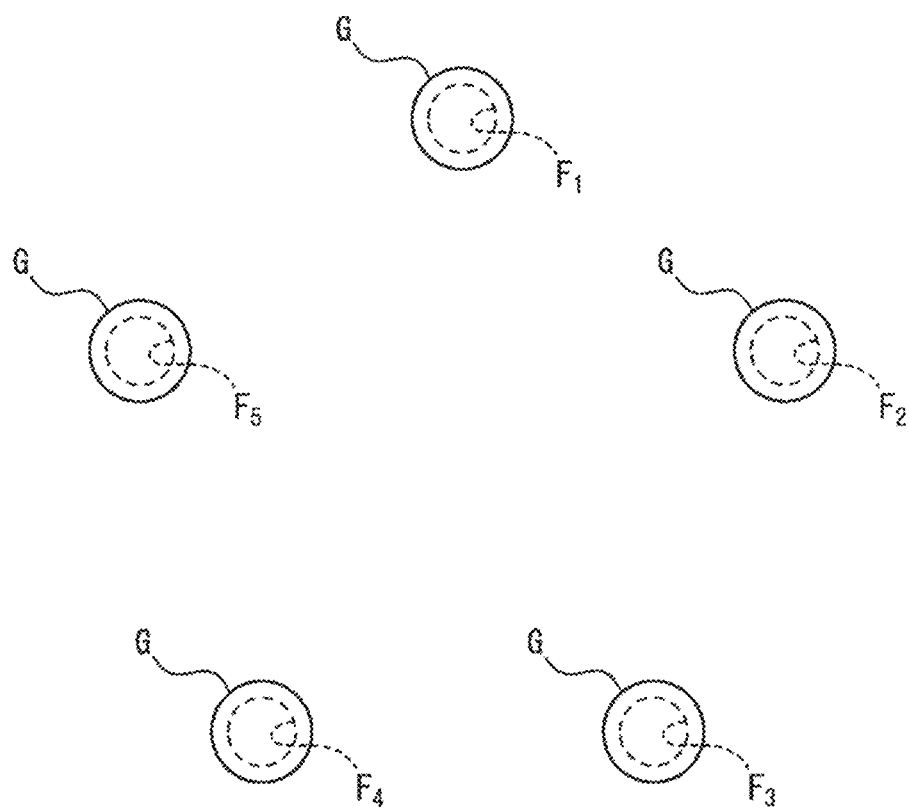
FIG. 5 is a diagram for describing an example of a work performed by a worker.
Figure 6:
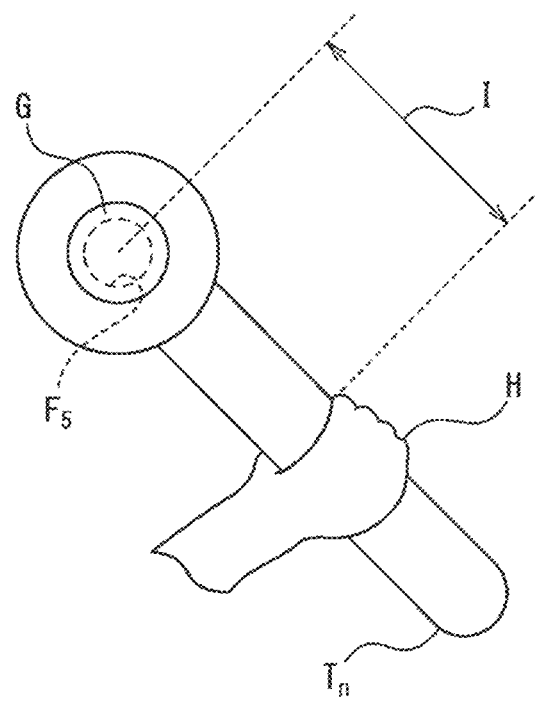
FIG. 6 illustrates the worker fastening a fastener in a fastening hole illustrated in FIG. 5 by using a tool.

Further, assume that a collection of detection data $DD_{100}$ to $DD_{199}$ indicates the motion of the worker A fastening next two fastening holes F (e.g., fastening holes $F_3$ and $F_4$) of the fastening holes $F_1$ to $F_5$ in FIG. 5. Further, assume that a collection of detection data $DD_{200}$ to $DD_{300}$ indicates the motion of the worker A fastening the last fastening hole F (e.g., fastening hole $F_5$) of the fastening holes $F_1$ to $F_5$ in FIG. 5.

In this case, the operator may assign the initial-stage label information $LI_1$ to the detection data $DD_1$ to $DD_{99}$, assign the midterm-stage label information $LI_2$ to the detection data $DD_{100}$ to $DD_{199}$, and assign the final-stage label information $LI_3$ to the detection data $DD_{200}$ to $DD_{300}$. When the operator assigns the label information LI, the display of the machine learning apparatus 50 displays detection data (image data) $DD_m$.

Then, while viewing the image of the detection data $DD_m$ displayed on the display, the operator operates the input device of the machine learning apparatus 50 so as to optionally give to the detection data $DD_m$ any of the initial-stage label information $LI_1$, the midterm-stage label information $LI_2$, and the final-stage label information $LI_3$, which indicate the progress of the n-th work.

In this way, the operator optionally gives the label information LI to the detection data $DD_m$ in accordance with the motion of the worker A indicated by the detection data $DD_m$. The learning data acquisition section 52 acquires, as the learning data set $DS_1$, the detection data $DD_m$ acquired from the detection device 14, and the label information LI input by the operator.

Note that, in the example illustrated in FIG. 8, for ease of understanding, a case has been described in which the detection device 14 detects a total of 300 pieces of detection data $DD_1$ to $DD_{300}$ during the n-th work. However, the detection device 14 may detect any number of pieces of detection data $DD_m$ during the n-th work. The operator may optionally decide which type of label information $LI_1$, $LI_2$ or $LI_3$ is to be given to the collection of any number of pieces of detection data $DD_m$, in accordance with the detected detection data $DD_m$.

Additionally, the label information LI is not limited to the above-described initial-stage label information $LI_1$, the midterm-stage label information $LI_2$, and the final-stage label information $LI_3$. For example, as the final-stage label information $LI_3$, a plurality of pieces of label information may be set in chronological order, such as "final stage 1", "final stage 2", and "final stage 3". Similarly, a plurality of pieces of label information may be set as the initial-stage label information $LI_1$ or the midterm-stage label information $LI_2$. Additionally, only the final-stage label information $LI_3$ may be given to the detection data $DD_m$.

The learning section 54 generates a learning model $LM_1$ (function) representing the correlation between the motion of the worker A performing the n-th work and the stage of the n-th work (initial stage, midterm stage, final stage), using the learning data set $DS_1$. For example, the learning section 54 carries out supervised learning to generate the learning model $LM_1$. In this case, the worker A repeatedly attempts the n-th work, and the learning data acquisition section 52 repeatedly acquires the learning data set $DS_1$ as supervised data each time the worker A performs the n-th work.

The learning section 54 learns the learning model $LM_1$ by identifying a feature that implies the correlation between the detection data $DD_m$ and the label information LI indicating the stage of n-th work (initial-stage label information $LI_1$, midterm-stage label information $LI_2$, and final-stage label information $LI_3$) acquired as the supervised data. As the supervised learning, an algorithm such as a Support Vector Machine (SVM) or a Gaussian Mixture Model (GMM) can be used, for example.

Figure 9:
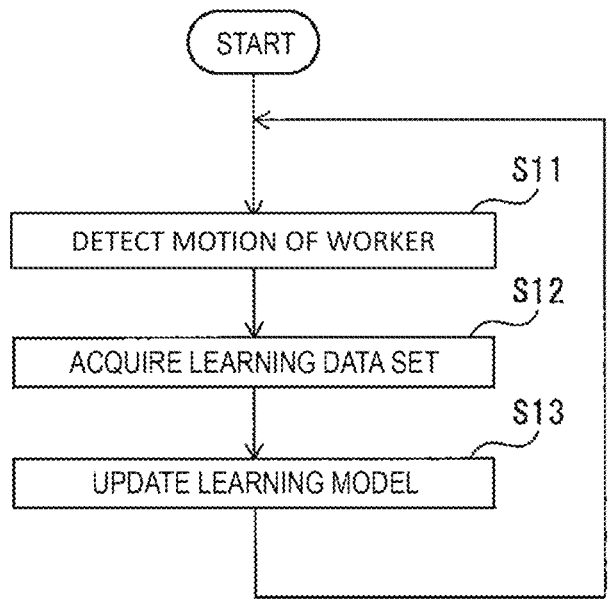
FIG. 9 is a flowchart illustrating an example of a learning flow carried out by the machine learning apparatus illustrated in FIG. 7.

A flow of a learning cycle performed by the machine learning apparatus 50 will be described below with reference to FIG. 9. In step S11, the worker A performs the n-th work, and the detection device 14 detects the motion of the worker A during the n-th work. In step S12, the learning data acquisition section 52 acquires the learning data set $DS_1$ of the detection data $DD_m$ and the label information LI, and stores the detection data $DD_m$ and the label information LI in the memory of the machine learning apparatus 50 in association with each other.

In step S13, the learning section 54 generates (or updates) the learning model $LM_1$ representing the correlation between the motion of the worker A performing the n-th work and the stage of the n-th work, using the learning data set $DS_1$ acquired in step S12. The flow then returns to step S11.

By carrying out such a learning cycle, the learning of the learning model $LM_1$ is advanced, whereby the learning model $LM_1$ is guided to an optimal solution. According to the present embodiment, it is possible to automatically and accurately obtain the learning model $LM_1$ which quantitatively represents the correlation between the motion of the worker A performing the n-th work and the stage of the n-th work.

Next, another embodiment of the function of the machine learning apparatus 50 will be described. In the present embodiment, the learning data acquisition section 52 acquires, as a learning data set $DS_2$, the above-described detection data $DD_m$ and the time t needed for the n-th work. For example, the learning data acquisition section 52 acquires, as the learning data set $DS_2$, the detection data $DD_1$ to $DD_{m\_p}$ indicating the motion of the worker A fastening first "p" fastening holes F (p is an integer of 4 or smaller) of the fastening holes $F_1$ to $F_5$ in FIG. 5, and the time t from a time point when the worker A completes fastening of the p-th fastening hole F to a time point when the n-th work is ended.

Specifically, the learning data acquisition section 52 acquires, as the learning data set $DS_2$, the detection data $DD_1$ to $DD_{99}$ indicating the motion of the worker A fastening the first two fastening holes F (e.g., fastening holes $F_1$ and $F_2$), and the time t from a time point when the worker A completes fastening of the second fastening hole F (e.g., fastening hole $F_2$) (i.e., a time point when the detection data $DD_{99}$ is detected) to a time point when the n-th work is ended (i.e., a time point when the detection data $DD_{300}$ is detected).

The learning section 54 generates a learning model $LM_2$ (function) representing the correlation between the motion of the worker A performing the n-th work and the time t needed for the n-th work (e.g., the time t from a time point when fastening of the p-th fastening hole F is completed to a time point when the n-th work is ended), using the learning data set $DS_2$ of the detection data $DD_m$ and the time t.

A flow of a learning cycle of the learning model $LM_2$ will be described below with reference to FIG. 9. The learning flow of the learning model $LM_2$ differs from the learning flow of the above-described learning model $LM_1$ in steps S12 and S13. Specifically, in step S12, the learning data acquisition section 52 acquires the learning data set $DS_2$ of the detection data $DD_m$ and the time t, and stores them in the memory of the machine learning apparatus 50 in association with each other.

In step S13, the learning section 54 generates the learning model $LM_2$ representing the correlation between the motion of the worker A performing the n-th work and the time t, using the learning data set $DS_2$ acquired in step S12. For example, the learning section 54 carries out the supervised learning algorithm (SVM, GMM, etc.) to learn the learning model $LM_2$. The flow then returns to step S11.

By carrying out such a learning cycle, the learning of the learning model $LM_2$ is advanced, whereby the learning model $LM_2$ is guided to the optimal solution. According to the present embodiment, it is possible to automatically and accurately obtain the learning model $LM_2$ which quantitatively represents the correlation between the motion of the worker A performing the n-th work and the time t needed for the n-th work.

Figure 10:
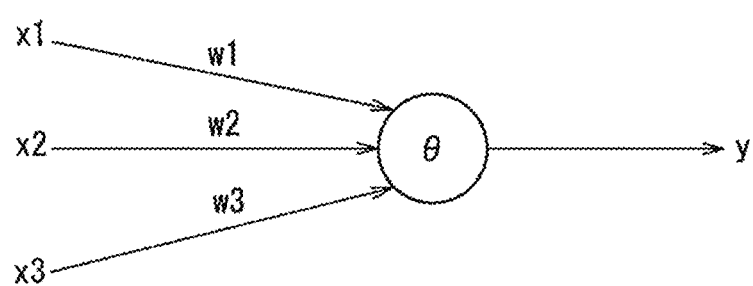
FIG. 10 schematically illustrates a neuron model.
Figure 11:
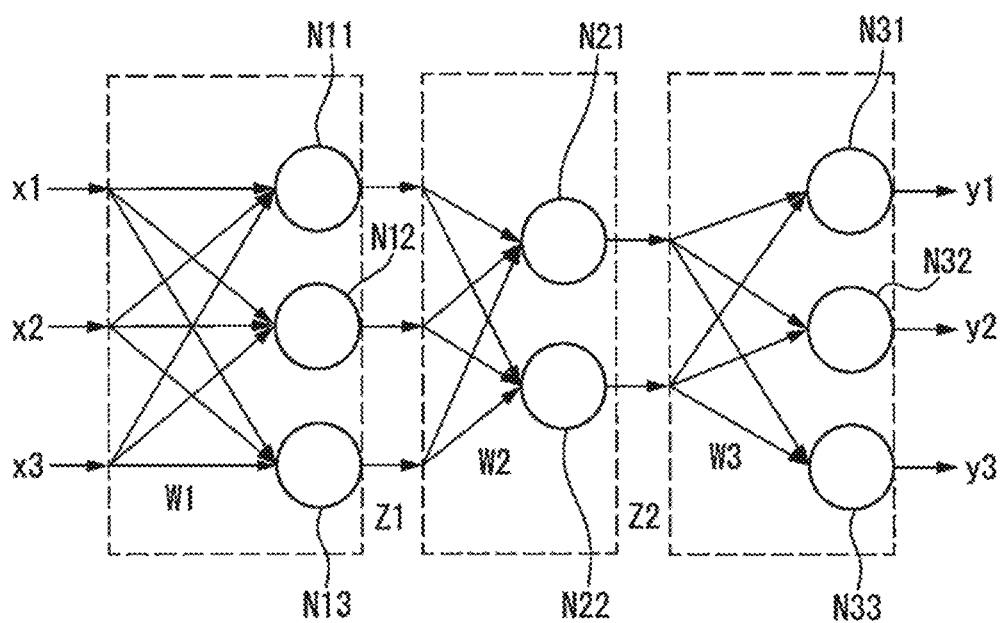
FIG. 11 schematically illustrates a multi-layer neural network model.

Note that the learning algorithm carried out by the learning section 54 is not limited to the supervised learning, but any learning algorithm known as machine learning, such as unsupervised learning, reinforcement learning, or a neural network, can be employed. As an example, FIG. 10 schematically illustrates a neuron model. FIG. 11 schematically illustrates a three-layer neural network model constructed by combining neurons illustrated in FIG. 10. The neural network can be configured by using, for example, a computing device and a storage device that simulate a neuron model.

The neuron illustrated in FIG. 10 outputs a result y in response to a plurality of inputs x (in FIG. 10, inputs x1 to x3 as an example). The inputs x (x1, x2, and x3) are respectively multiplied by weights w (w1, w2, and w3). The relationship between the inputs x and the result y can be represented by Formula 1 given below. Note that all of the inputs x, the result y, and the weights w are vectors. In Formula 1, θ is a bias, and $f_k$ is an activation function.

$$y = f_k(\Sigma_{i=1}^n x_i w_i - \theta) \quad (1)$$

In the three-layer neural network illustrated in FIG. 11, the plurality of inputs x (in FIG. 11, the inputs x1 to x3 as an example) are input from the left side, and the result y (in FIG. 11, results y1 to y3 as an example) are output from the right side. In the illustrated example, the inputs x1, x2, and x3 are respectively multiplied by the corresponding weights (collectively represented as W1), and each of the inputs x1, x2, and x3 is input to three neurons N11, N12, and N13.

In FIG. 11, outputs from the neurons N11 to N13 are collectively represented as Z1. Z1 can be regarded as feature vectors obtained by extracting the feature amounts of the input vectors. In the illustrated example, the feature vectors Z1 are respectively multiplied by the corresponding weights (collectively represented as W2), and each of the feature vectors Z1 is input to two neurons N21 and N22. The feature vectors Z1 represent features between the weight W1 and the weight W2.

In FIG. 11, outputs from the neurons N21 to N22 are collectively represented as Z2. Z2 can be regarded as feature vectors obtained by extracting the feature amounts of the feature vectors Z1. In the illustrated example, the feature vector Z2 are respectively multiplied by the corresponding weights (collectively represented as W3), and each of the feature vectors Z2 is input to three neurons N31, N32, and N33.

The feature vectors Z2 represent features between the weight W2 and the weight W3. Lastly, the neurons N31 to N33 respectively output the results y1 to y3. The machine learning machine 50 can learn the learning model LM ($LM_1$ or $LM_2$) by using the learning data set DS ($DS_1$ or $DS_2$) as input and performing a multilayer structure computation according to the neural network described above.

The configuration of the above-mentioned machine learning apparatus 50 can be described as a machine learning method (or software) carried out by a processor of a computer. The machine learning method includes, by a processor, acquiring, as the learning data set $DS_1$ or $DS_2$, the detection data $DD_m$ of the detection device 14 detecting the motion of the worker A when the worker A is performing the n-th work, and the label information LI indicating the stage of the n-th work or the time t needed for the n-th work; and generating the learning model $LM_1$ or $LM_2$ representing the correlation between the motion of the worker A and the stage of the n-th work or the time t, using the learning data set $DS_1$ or $DS_2$.

Figure 2:
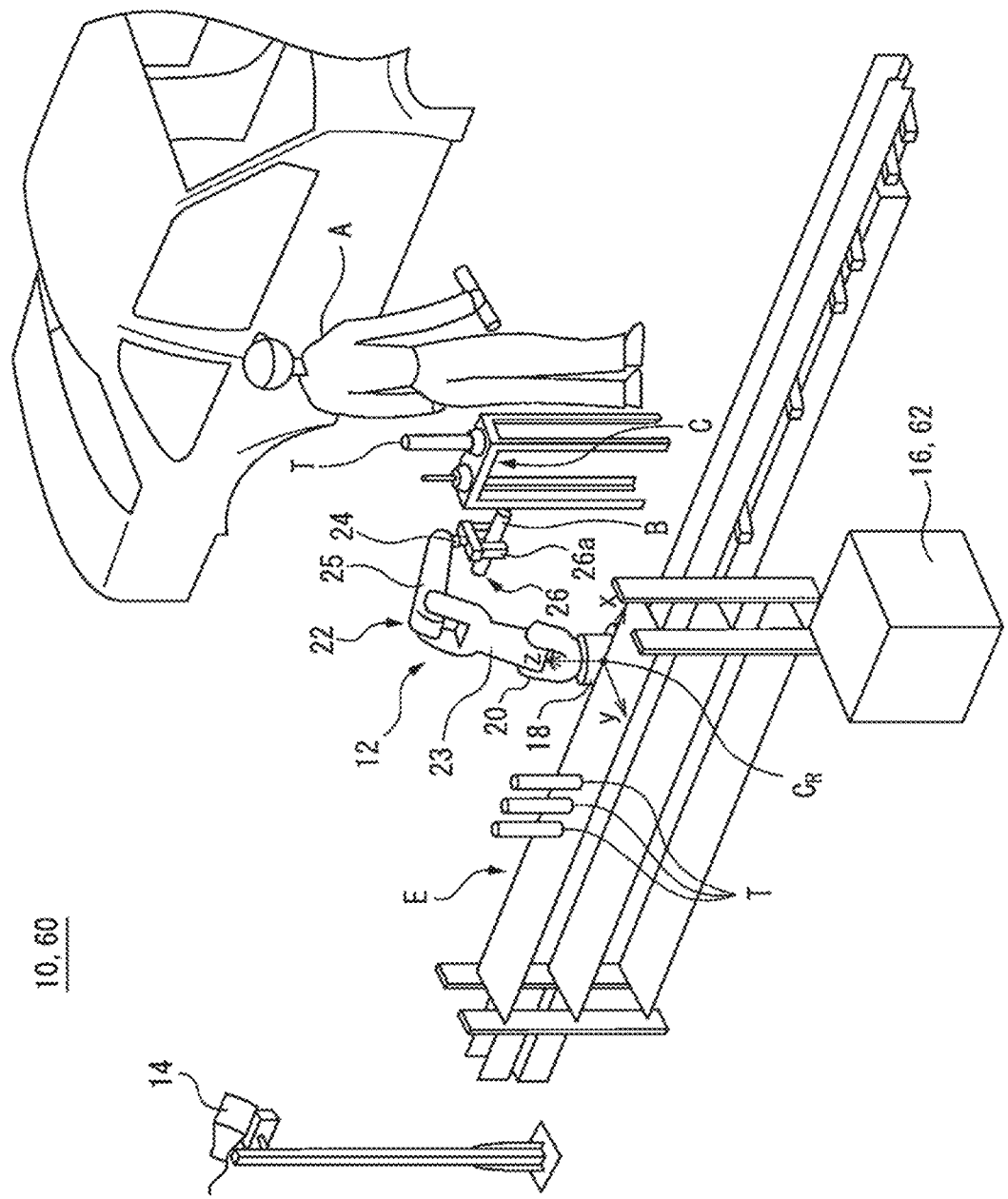
FIG. 2 is a perspective view of the robot system illustrated in FIG. 1.
Figure 12:
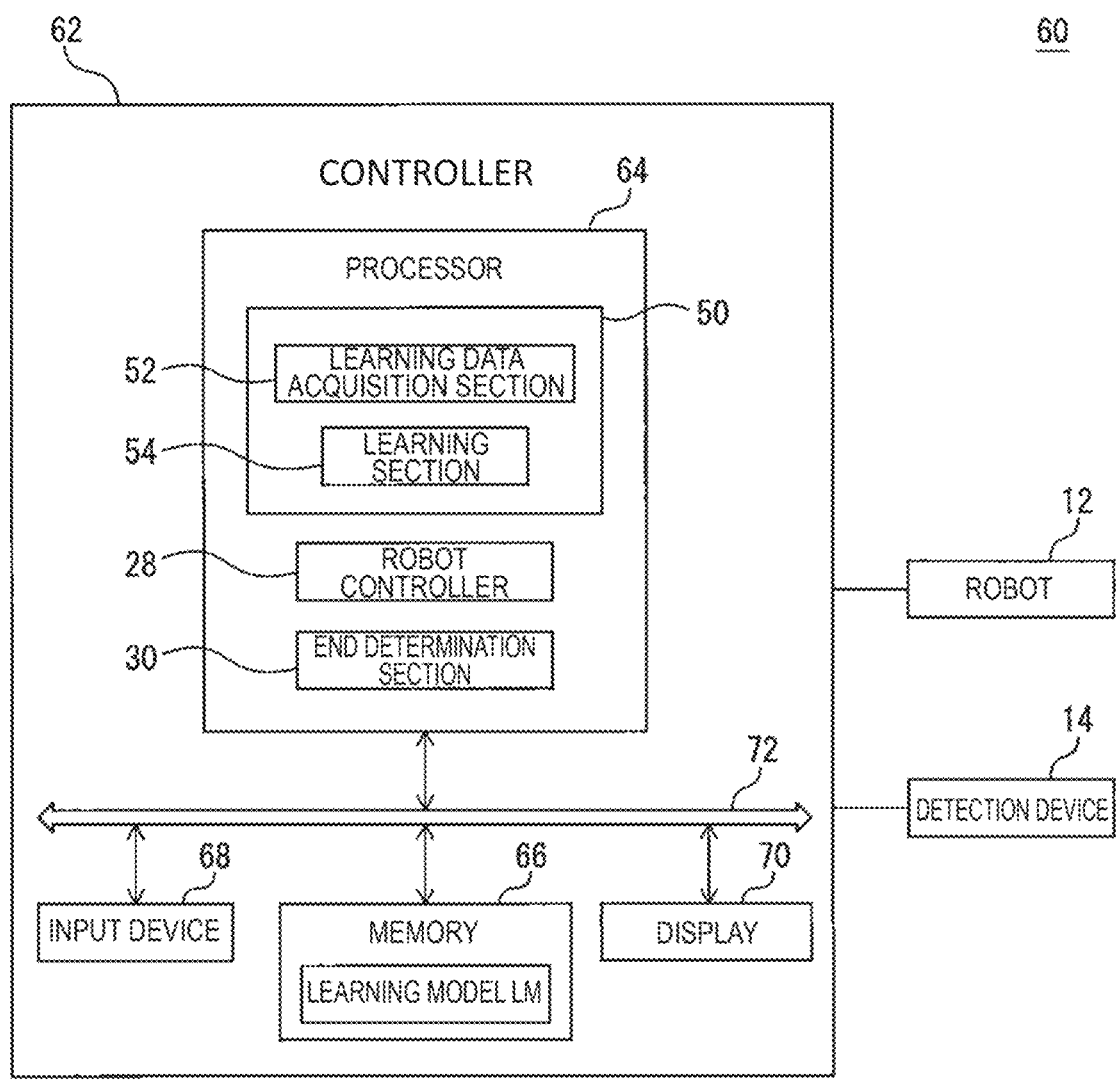
FIG. 12 is a block diagram of a robot system according to another embodiment.

Now, a robot system 60 according to another embodiment will be described with reference to FIGS. 2 and 12. The robot system 60 includes the robot 12, the detection device 14, and a controller 62. The controller 62 is a computer including a processor 64 (CPU, GPU, etc.), a memory 66 (ROM, RAM, etc.), an input device 68 (keyboard, mouse, touch sensor, etc.), and a display 70 (liquid crystal display, organic EL display, etc.). The processor 64, the memory 66, the input device 68, and the display 70 are communicatively connected together via a bus 72.

In the present embodiment, the machine learning apparatus 50 is installed in the controller 62 as hardware or software, and the processor 64 carries out various arithmetic processing to carry out the function of the machine learning apparatus 50, while communicating with the memory 66, the input device 68, and the display 70. Thus, in the present embodiment, the processor 64 functions as the learning data acquisition section 52 and the learning section 54. The memory 66 pre-stores the learning model LM (LM$_1$ or LM$_2$) learned by the machine learning apparatus 50.

Next, the operation of the robot system 60 will be described with reference to FIG. 3. The processor 64 functions as the above-described robot controller 28 and the end determination section 30, and carries out the flow illustrated in FIG. 3 while communicating with the memory 66, the input device 68, and the display 70. The operation flow of the robot system 60 differs from that of the above-described robot system 10 in the following processes.

Specifically, in step S4, the detection device 14 starts to detect the motion of the worker A. At this time, the detection device 14 continuously captures an image (moving image) of the worker A to detect the motion of the worker A, under the same conditions as those in the above-described step S11 carried out in the learning stage of the learning model LM. Specifically, the detection device 14 images the worker A under the same imaging conditions (shutter speed, imaging speed, etc.) as those in above-described step S11 along the same visual line direction VD as that in step S11. The detection device 14 sequentially transmits continuously acquired detection data DD$_m$' to the processor 64.

In step S5, the processor 64 determines whether or not the n-th work is ended on the basis of the detection data DD$_m$' of the detection device 14 and the learning model LM. If the memory 66 stores the learning model LM$_1$, the processor 64 inputs to the learning model LM$_1$ the continuous detection data DD$_m$' acquired from the detection device 14 after the start of step S4.

In response, the learning model LM$_1$ estimates and outputs the label information LI (i.e., the initial-stage label information LI$_1$, the midterm-stage label information LI$_2$, or the final-stage label information LI$_3$) having a correlation with the input detection data DD$_m$'. As an example, in this step S5, the processor 64 determines YES when it detects that the learning model LM$_1$ outputs the final-stage label information LI$_3$. As another example, the processor 64 may determine YES when a predetermined time elapses from a time point when it detects that the learning model LM outputs the final-stage label information LI$_3$.

On the other hand, if the memory 66 stores the learning model LM$_2$, in step S5, the processor 64 inputs to the learning model LM$_2$ the continuous detection data DD$_m$' acquired from the detection device 14 after the start of step S4. For example, when the detection data DD$_1$' to DD$_{m\_p}$' indicating the motion of the worker A performing fastening of the first p fastening holes F is input to the learning model LM$_2$, the learning model LM$_2$ estimates and outputs the time t from a time point when fastening of the p-th fastening hole F is completed to a time point when the n-th work is ended.

By the output time t, the processor 64 can recognize the time when the n-th work is ended, and determine the timing of when the n-th work is ended. For example, the processor 64 clocks an elapsed time τ from a time point when the processor 64 acquires the detection data DD$_{m\_p}$' indicating the motion of the worker A performing the fastening of the p-th fastening hole F, and determines YES when the elapsed time τ reaches the time t output by the learning model LM$_2$ (or a time before the time t by a predetermined time).

In this way, the processor 64 functions as the end determination section 30 to determine whether or not the n-th work is ended on the basis of the detection data DD$_m$' and the learning model LM. According to the present embodiment, the processor 64 can more-accurately determine the timing of when the n-th work is ended, by employing the learning model LM.

Note that, in the above-described embodiments, the robot systems 10 and 60 assist the work of one worker A. However, the robot system 10 or 60 may be configured to assist the works of a plurality of workers A. Such an embodiment is illustrated in FIGS. 13 and 14.

Figure 13:
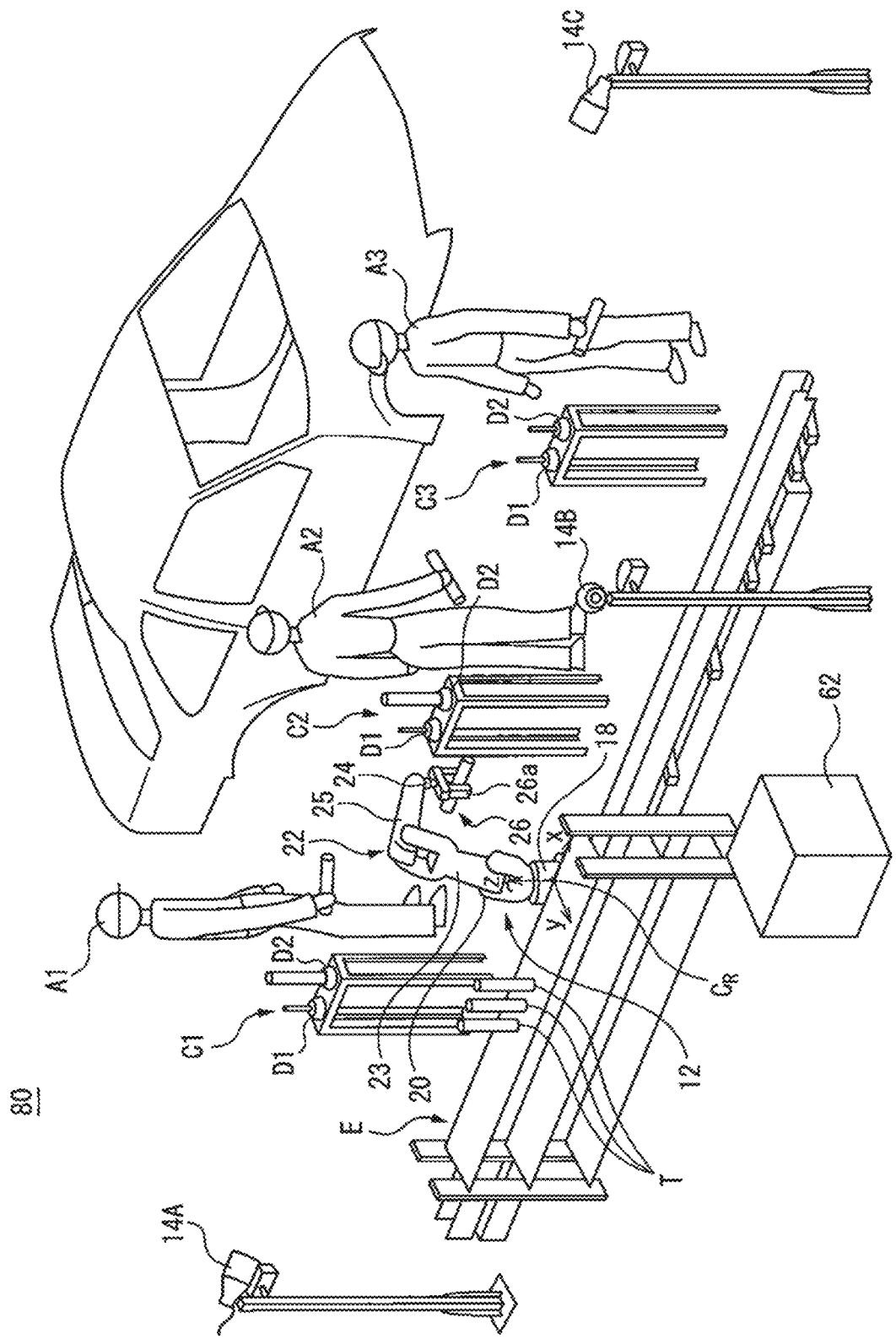
FIG. 13 is a perspective view of a robot system according to still another embodiment.
Figure 14:
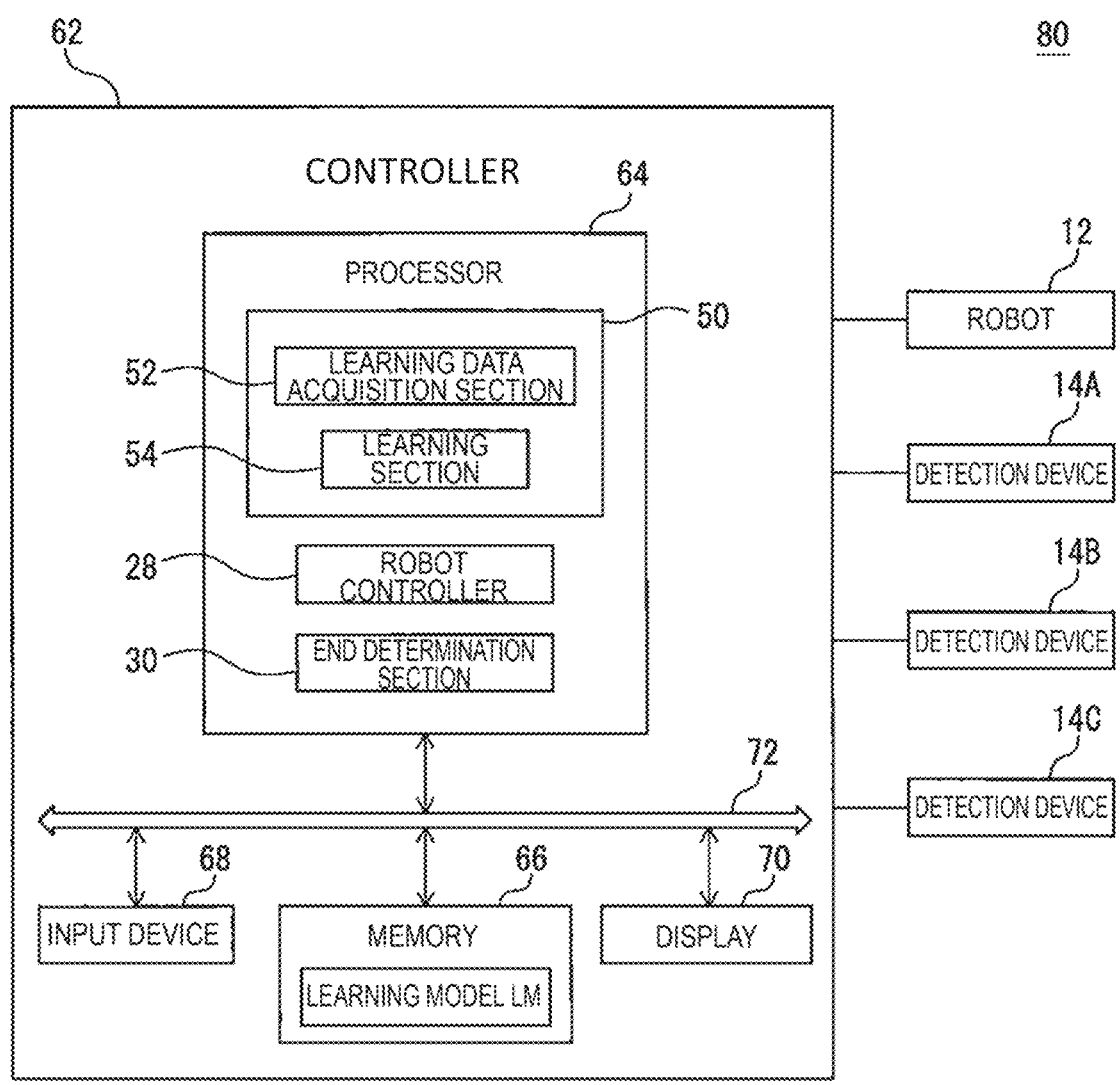
FIG. 14 is a block diagram of the robot system illustrated in FIG. 11.

A robot system 80 illustrated in FIGS. 13 and 14 is configured to assist works of three workers A$_1$, A$_2$ and A$_3$. Specifically, the robot system 80 includes the robot 12, detection devices 14A, 14B and 14C, and the controller 62. The detection devices 14A, 14B and 14C each have the same configuration as that of the above-described detection device 14. The detection device 14A detects the motion of the worker A$_1$, the detection device 14B detects the motion of the worker A$_2$, and the detection device 14C detects the motion of the worker A$_3$.

In addition, a placing table C$_1$ for the worker A$_1$, a placing table C$_2$ for the worker A$_2$, and a placing table C$_3$ for the worker A$_3$ are installed at respective predetermined positions within the work cell. The first jig D$_1$ and the second jig D$_2$ are provided at each of the placing tables C$_1$, C$_2$, and C$_3$.

The processor 64 of the controller 62 of the robot system 80 carries out the flow illustrated in FIG. 3 in parallel for each of the workers A$_1$, A$_2$ and A$_3$ in order to feed the articles (tools T) for the works to the workers A$_1$, A$_2$ and A$_3$ (i.e., the article-feed operation), and to fetch the articles used by the workers A$_1$, A$_2$ and A$_3$ for the works (article-fetch operation).

Note that the learning model LM (LM$_1$, LM$_2$) stored in the memory 66 of the controller 62 of the robot system 80 includes a learning model LM$_{\_A}$ (LM$_{1\_A}$, LM$_{2\_A}$) learned by using the detection data obtained by the detection device 14A which detects the motion of the worker A$_1$, a learning model LM$_{\_B}$ (LM$_{1\_B}$, LM$_{2\_B}$) learned by using the detection data obtained by the detection device 14B which detects the motion of the worker A$_2$, and a learning model LM$_{\_C}$ (LM$_{1\_C}$, LM$_{2\_C}$) learned by using the detection data obtained by the detection device 14C which detects the motion of the worker A$_2$.

Here, the type and order of the work to be performed may vary among the workers A$_1$, A$_2$, and A$_3$. In this case, when the flow illustrated in FIG. 3 is carried out in parallel, for each of the workers A1, A2, and A3, the work information acquired in step S1 will differ from each other for the workers A1, A2, and A3.

Additionally, when the flow illustrated in FIG. 3 is carried out in parallel for each of the workers A$_1$, A$_2$, and A$_3$, the timing of when the works by at least two workers A$_1$, A$_2$ and A$_3$ is ended, which are determined by the processor 64 in step S5, may be temporally close to each other. In this case, the processor 64 may determine the order in which the at least two workers A$_1$, A$_2$ and A$_3$ end their works, and may carry out step S8 for these workers A$_1$, A$_2$, A$_3$ in accordance with the order.

Below, a case will be described in which the timing of end of the works by the workers $A_1$ and $A_2$ are close to each other. If the above-described learning model $LM_2$ is employed, in above step S5, the processor 64 can estimate the times when the workers $A_1$ and $A_2$ end their works, as stated above. Accordingly, the processor 64 can determine whether the times at which the workers $A_1$ and $A_2$ end their works are close to each other, and can also determine the order in which the works by the workers $A_1$ and $A_2$ are ended.

For example, if the processor 64 determines that the worker $A_1$ ends his/her work before the worker $A_2$, the processor 64 carries out step S8 for the worker $A_1$, and subsequently, carries out step S8 for the worker $A_2$. In this case, in step S5 of the flow executed for the worker $A_1$, the processor 64 may determine YES when the time before the time point, when the work is estimated to be ended by the learning model $LM_{2\_A}$, by the predetermined time is reached.

On the other hand, in step S5 of the flow for the worker $A_2$, the processor may determine YES at the time when the learning model $LM_{2\_B}$ estimates that the work is ended. Thus, the processor 64 can carry out step S8 at different timings for the workers A1 and A2 in the order in which the works are ended, even if the timings of when the works of the workers $A_1$ and $A_2$ are ended are close to each other.

Alternatively, similarly as step S5 in the above-described robot system 10, the processor 64 of the robot system 80 can monitor whether the motion of the worker A indicated by the detection data $DD_m$ matches the reference motion pattern, and determine that the n-th work is ended when the motion of the worker A matches the reference motion pattern. In this case, if the timing of when the works by the workers $A_1$ and $A_2$ are ended are close to each other, the processor 64 can determine which of the motions of the workers $A_1$ and $A_2$ first match the reference motion pattern.

For example, if the motion of the worker $A_1$ matches the reference motion pattern before the motion of the worker $A_2$, step S8 is carried out first for the worker $A_1$, and subsequently for the worker $A_2$. In this case, in step S5 of the flow carried out for the worker $A_1$, the processor 64 determines YES when determining that the motion of the worker $A_1$ matches the reference motion pattern, and executes step S8 for the worker $A_1$.

On the other hand, in step S5 of the flow for the worker $A_2$, the processor 64 determines YES after a predetermined time elapsed from the time point when the processor 64 determines that the motion of the worker $A_2$ matches the reference motion pattern, and carries out step S8 for the worker $A_2$. Whereby, the processor 64 can carry out step S8 at different timings for the workers $A_1$ and $A_2$ in the order in which the works is ended.

By the control method as described above, even if the timing of when the works by at least two of the workers $A_1$, $A_2$ and $A_3$ are ended are temporally close to each other, step S8 (article-feed operation) and step S9 (article-fetch operation) can be smoothly carried out for the workers $A_1$, $A_2$, and $A_3$, without interrupting the motions of the robot 12 or the workers $A_1$, $A_2$, and $A_3$.

In addition, since the articles can be efficiently fed by the robot 12, the operation rate of the robot 12 can be increased. As a result, it is not necessary to provide a plurality of robots to assist the works of the respective workers $A_1$, $A_2$, and $A_3$, and the single robot 12 can assist the works of the workers $A_1$, $A_2$, and $A_3$. Thus, the cost of the robot system 80 can be reduced.

Note that, in the robot system 80, the processor 64 may carry out, for any of the workers $A_1$, $A_2$, and $A_3$, the flow in FIG. 3 performed by the above-described robot system 10 (i.e., the flow not using the learning model LM in step S5). In this case, the processor 64 carries out the flow in FIG. 3 which does not use the learning model LM, and the flow in FIG. 3 which uses the learning model LM in parallel for the different workers. Additionally, in the robot system 80, the single detection device 14 may be configured to detect the motions of the workers $A_1$, $A_2$, and $A_3$.

In the above described embodiments, the robot 12 sets the n-th tool $T_n$ to the first jig $D_1$ in step S8. However, the robot 12 may hand the n-th tool $T_n$ directly to the worker A (or $A_1$, $A_2$, or $A_3$).

In this case, in step S8, the controller 16 or 62 (processor 64) transports the n-th tool $T_n$ grasped by the robot 12 with the robot hand 26 to a predetermined handing position, as the article-feed operation. The handing position is defined as a position close to the worker A, where the n-th tool $T_n$ is to be handed to the worker A. The position data of the handing position in the robot coordinate system $C_R$ is pre-stored in the memory (66). The worker A (or $A_1$, $A_2$, or $A_3$) receives, by his/her hand H, the n-th tool $T_n$ arranged at the handing position by the robot 12 in step S8.

In this case, the robot 12 may be provided with a force sensor configured to detect an external force F applied to the robot hand 26. If the worker A (or $A_1$, $A_2$, or $A_3$) receives the n-th tool $T_n$ from the robot 12 by his/her hand H, the external force F applied to the robot hand 26 varies. The controller 16 or 62 (processor 64) may monitor the external force F detected by the force sensor, and determine that the worker A receives the n-th tool $T_n$ when the external force F varies to exceed a predetermined threshold, and then proceed to step S9.

In the above described embodiments, in step S9, the robot 12 grasps and fetches the (n−1)-th tool $T_{n-1}$, which has been used for the most-recently performed (n−1)-th work and set on the second jig $D_2$. However, the robot 12 may receive the (n−1)-th tool $T_{n-1}$ directly from the worker A (or $A_1$, $A_2$, or $A_3$).

In this case, the robot 12 may be provided with a force sensor configured to detect the external force F applied to the robot hand 26. Then, in step S9, the controller 16 or 62 (processor 64) performs the article-fetch operation to arrange the hand-tip (TCP) of the robot hand 26 at the handing position along with opening the fingers 26*a* of the robot hand 26. Then, the worker A (or $A_1$, $A_2$, or $A_3$) inserts the (n−1)-th tool between the fingers 26*a* of the robot hand 26, and applies the external force F to the robot hand 26 through the (n−1)-th tool $T_{n-1}$. The force sensor detects the external force F at this time.

The controller 16 or 62 (processor 64) closes the fingers 26*a* of the robot hand 26 to grasp the (n−1)-th tool $T_{n-1}$ when the external force F detected by the force sensor exceeds the predetermined threshold. In this way, the robot 12 can receive the (n−1)-th tool $T_{n-1}$ directly from the worker A (or $A_1$, $A_2$, or $A_3$). Then, the controller 16 or 62 (processor 64) transports the received (n−1)-th tool $T_{n-1}$ to the predetermined position on the storage stand E.

In the above-described the embodiments, the detection device 14 detects the motion of the worker A (or $A_1$, $A_2$, or $A_3$) on the basis of the image of the worker A (or $A_1$, $A_2$, or $A_3$), by optical motion capture. However, the detection device may detect the motion of the worker A (or $A_1$, $A_2$, or $A_3$) by a so-called inertial sensor notion capture. In this case, the detection device includes a plurality of acceleration sensors provided at respective locations on the body of the worker A (or $A_1$, $A_2$, or $A_3$), and detects the motion of the worker A (or $A_1$, $A_2$, or $A_3$) from output signals from the acceleration sensors.

If the learning model LM is learned by the machine learning apparatus 50 using a detection device including such acceleration sensors, the processor 64 (learning data acquisition section 52) may acquire, as the learning data set DS, the output signal from each acceleration sensor as detection data. Alternatively, the processor 64 (learning data acquisition section 52) may acquire, as the learning data set DS, detection data (image data) which indicates the motion of the worker A (or $A_1$, $A_2$, or $A_3$) and which is obtained from the output signal from each acceleration sensor. Additionally, the detection device may employ any type of motion capture technology, such as a mechanical or magnetic type.

In the above-described embodiments, the controller 16 (processor 64) functions as the end determination section 30 and determines whether the n-th work is ended based on the detection data DD of the detection device 14. However, the image processing processor provided in the detection device 14 may function as the end determination section 30 to determine whether the n-th work is ended on the basis of the detection data DD.

Additionally, in the above-described embodiments, the n-th work is defined as fastening the fasteners G to the fastening holes $F_1$ to $F_5$ in the order of the fastening holes $F_1 \rightarrow F_2 \rightarrow F_3 \rightarrow F_4 \rightarrow F_5$. However, the order in which fasteners G are to be fastened to the fastening holes $F_1$ to $F_5$ may be any order. Additionally, the number of fastening holes $F_1$ to $F_5$ may be any number.

Furthermore, the n-th work is not limited to the fastening work. For example, the n-th work may be welding (e.g., spot welding) by the worker A onto a first welding spot, a second welding spot, . . . , an n-th welding spot, using the n-th tool which is a welding torch. Alternatively, the n-th work may be painting by the worker A onto a first painting area, a second painting area, . . . , and an n-th painting area, sequentially, using the n-th tool which is a paint applicator. Alternatively, the n-th work may be soldering electronic components to a first mounting position, a second mounting position, . . . , and an n-th mounting position on a substrate, using the n-th tool which is a soldering gun, by the worker A.

Additionally, in the above-described embodiments, the robot 12 feeds and fetches the tool T to and from the worker, as an article for the work. However, as an article for the work, the robot 12 may feed and fetch a component (fasteners G such as bolts or electronic components such as IC chips) to be attached to a product. Additionally, the robot hand 26 is not limited to one configured to grasp the article with the fingers 26*a*, but may include a suction section configured to suck the article. In addition, the robot 12 is not limited to the vertical articulated type, but may be any type of robot, such as a horizontal articulated robot or parallel link robot. Although the present disclosure has been described through the above embodiments, the above embodiments are not intended to limit the claimed invention.

The invention claimed is:

1. A robot system configured to assist a work by a worker, the robot system comprising:
a robot;
a detection device configured to detect a motion of a portion of the worker's body continuously in time-series by motion capturing, in response to the worker performing a predetermined work onto a plurality of working locations in a predetermined order;
a processor configured to:
calculate a distance between the portion of the worker's body and a last working location of the plurality of working locations, which is to be worked last, based on detection data of the detection device;
determine that the work has ended when the distance is equal to or smaller than a predetermined threshold; and
in response to the processor determining that the work has ended, cause the robot to perform:
an article-feed operation to transport an article for the work to a predetermined position in order to feed the article to the worker; or
an article-fetch operation to fetch an article which has been used for the work and transport the article to a predetermined storage location.

2. The robot system of claim 1, wherein the processor is configured to:
monitor whether or not the motion detected by the detection device matches a reference motion pattern predetermined as a reference motion of the worker in response to the worker performing the work; and
determine that the work has ended in response to the motion matching the reference motion pattern.

3. The robot system of claim 1, wherein the processor is configured to determine whether or not the work has ended, further based on a learning model representing a correlation between the motion and a stage of the work or a time needed for the work.

4. The robot system of claim 1, wherein, after performing the article-feed operation, the processor is configured to cause the robot to perform the article-fetch operation to fetch the article used for the most-recently performed work and transport the article to the predetermined storage location.

5. The robot system of claim 1, wherein, in response to the processor determining that the work has ended, the processor is configured to cause the robot to perform the article-feed operation.

6. The robot system of claim 1, wherein, in response to the processor determining that the work has ended, the processor is configured to cause the robot to perform the article-fetch operation.

7. The robot system of claim 1, wherein the processor is configured to monitor whether or not the motion detected by the detection device matches a reference motion pattern predetermined as a reference motion of the worker when the worker performs the work onto the last working location.

8. The robot system of claim 7, wherein the processor is configured to determine that the work is ended when the motion matches the reference motion pattern.

9. A method of controlling a robot configured to assist a work by a worker, the method comprising:
detecting, by a detection device, a motion of a portion of the worker's body continuously in time-series by motion capturing, in response to the worker performing a predetermined work onto a plurality of working locations in a predetermined order;
calculating a distance between the portion of the worker's body and a last working location of the plurality of working locations, which is to be worked last, based on detection data of the detection device;
determining that the work has ended when the distance is equal to or smaller than a predetermined threshold; and
in response to the determination that the work has ended, causing the robot to perform:

an article-feed operation to transport an article for the work to a predetermined position in order to feed the article to the worker; or an article-fetch operation to fetch an article which has been used for the work and transport the article to a predetermined storage location.

10. A machine learning apparatus configured to learn a timing of when a work by a worker has ended, the worker performing the work onto a plurality of working locations in a predetermined order, the machine learning apparatus comprising a processor configured to:

acquire, as a learning data set,
detection data of a detection device detecting a motion of the worker during performing the work onto at least one of the plurality of working locations, and
from a time point when the work onto the at least one of the plurality of working locations is ended to a time point when the work onto a last one of the plurality of working locations, which is to be worked last, is ended; and generate a learning model representing a correlation between the motion and the time, using the learning data set, wherein the learning model is configured to receive an input of the detection data, and output the time which corresponds to the motion indicated by the input detection data, in order to determine the timing of when the work has ended, and in response to the determination that the work has ended, a robot is caused to perform:
an article-feed operation to transport an article for the work to a predetermined position in order to feed the article to the worker; or
an article-fetch operation to fetch an article which has been used for the work and transport the article to a predetermined storage location.

11. A machine learning method of learning a timing of when a work by a worker has ended, the worker performing the work onto a plurality of working locations in a predetermined order, the machine learning method comprising:

acquiring, as a learning data set,
detection data of a detection device detecting a motion of the worker during performing the work onto at least one of the plurality of working locations, and
a time from a time point when the work onto the at least one of the plurality of working locations is ended to a time point when the work onto a last one of the plurality of working locations, which is to be worked last, is ended; and generating a learning model representing a correlation between the motion and the time, using the learning data set, wherein the learning model is configured to receive an input of the detection data, and output the time which corresponds to the motion indicated by the input detection data, in order to determine the timing of when the work has ended, and in response to the determination that the work has ended, a robot is caused to perform:
an article-feed operation to transport an article for the work to a predetermined position in order to feed the article to the worker; or
an article-fetch operation to fetch an article which has been used for the work and transport the article to a predetermined storage location.

\* \* \* \* \*